Patented Apr. 16, 1929.

1,709,366

UNITED STATES PATENT OFFICE.

AUGUST E. NIENSTADT, OF HAWTHORNE, NEW JERSEY, ASSIGNOR, BY MESNE ASSIGNMENTS, TO A. F. STOEGER, INC., OF NEW YORK, N. Y., A CORPORATION OF NEW YORK.

MALT AND MALTOSE PREPARATION.

No Drawing.   Application filed September 20, 1923.   Serial No. 663,926.

This invention relates to the manufacture of preparations derived in whole or in part from malt and the object of the invention is to bring such preparations to a condition where they are readily and easily miscible with and soluble in liquids such as water, milk and the like. The invention applies generally to malt syrups and malt extracts, maltose, and malt and cereal syrups generally.

Heretofore malt extracts and malt syrup have existed on the market only in the form of material which mixed very slowly with water and other liquids, being a relatively difficultly soluble non-clarified viscous mass. I have now discovered that by the treatment hereinafter detailed I am able to convert into easily soluble substances the malt syrups and malt extracts of the market and incidentally I also clarify and liquefy the same. The treatment is equally effective on maltose and maltose products of many varieties, including malt and cereal syrups. When thus treated, the product suffers no diminution of any valuable property, but, on the contrary, merely acquires valuable attributes.

The treatment constituting this invention involves primarily the use of a coagulant such as albumen and preferably an edible albuminous material such as the whites of eggs. As illustrative of my method of procedure I dissolve the whites of two eggs in one pint of lukewarm water by first beating the albumen with an egg-beater to a slight foam and gradually adding the water. The solution thus obtained is mixed with about two and one-half pounds of malt extract of about 40° Bé. (i. e. a heavy viscous, consumable, not readily soluble malt extract), and the mixture is heated to about 158° F. After coagulation of the albumen the mixture is filtered, preferably in a vacuum filtering machine or in a filter press. Shredded vegetable parchment paper or the like, when added in small quantities, aids in the filtering process.

Instead of egg albumen directly from the eggs, the dried egg-white of commerce can be used. It is obvious that equivalents are intended to be included as within the scope of this invention. Although malt extract has been mentioned in the specific example above stated, the invention is equally applicable to and embraces any maltose syrup or malt syrup or malt extract or maltose or substances or combinations of substances possessing like characteristics.

I claim:

1. The process of converting a malt extract into a potable form easily soluble in an aqueous medium which comprises dissolving beaten whites of eggs with warm water, mixing the watery mass into malt extract of about 40° Bé., heating the malt mixture to about 158° F., and filtering out any material precipitated by said heat treatment.

2. The process of converting a malt extract into a potable form easily soluble in an aqueous medium which comprises beating the whites of eggs in lukewarm water in the ratio of two eggs to about one pint of water, mixing the said aqueous egg mixture thus obtained with malt extract of about 40° Bé. in the approximate ratio of about one pint of said aqueous egg mixture to about two and one-half pounds of said malt extract, heating the malt mixture to about 158° F., and filtering out any material precipitated in said malt mixture by said heat treatment.

3. The process as set forth in claim 1 in which the filtering step is conducted while the malt mixture is still hot.

4. Process of converting a heavy viscous, not readily soluble, consumable malt extract into a potable form easily soluble in an aqueous medium which comprises dissolving in water edible albuminous matter coagulatable at moderate temperatures, mixing the watery mass into malt extract of about 40° Bé., heating the malt mixture to about 158° F., and filtering out any material precipitated by said heat treatment.

5. Process of converting a heavy viscous, not readily soluble, consumable malt extract into a potable form easily soluble in an aqueous medium which comprises dissolving in water edible albuminous matter coagulatable at moderate temperatures, mixing the watery mass into malt extract of about 40° Bé., heating the malt mixture to about 158° F., adding shredded material to aid in the filtration of the mixture, and then separating any material precipitated by said heat treatment by filterng out the same in association with previously added shredded material.

6. A potable malt extract readily miscible with water and possessing the characteristics of a product obtained by treating a heavy viscous, consumable, not readily soluble malt extract with a water solution of edible albuminous matter coagulatable at moderate temperatures, heating the mixture to about 158° F., and filtering out the material precipitated by the heat treatment.

In testimony whereof I have hereunto set my hand.

AUGUST E. NIENSTADT.